United States Patent
Schach et al.

(10) Patent No.: US 6,957,901 B2
(45) Date of Patent: Oct. 25, 2005

(54) BACKLIGHTING DEVICE INCLUDING LENS

(75) Inventors: Harald Schach, Flacht (DE); Pascal Benoit, Rennes (FR); Matthias Gebauer, Rentlingen (DE); Georg Ewald, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/275,143
(22) PCT Filed: Apr. 27, 2001
(86) PCT No.: PCT/DE01/01590
§ 371 (c)(1), (2), (4) Date: Apr. 11, 2003
(87) PCT Pub. No.: WO01/83264
PCT Pub. Date: Nov. 8, 2001

(65) Prior Publication Data
US 2003/0161137 A1 Aug. 28, 2003

(30) Foreign Application Priority Data
May 2, 2000 (DE) .......................................... 100 21 114

(51) Int. Cl.⁷ ................................................. B60Q 3/04
(52) U.S. Cl. ........................ 362/489; 362/509; 362/511; 362/28; 362/29
(58) Field of Search ................................ 362/509, 511, 362/489, 459, 482, 487, 488, 520, 522, 327, 330, 317, 326, 328, 329, 332, 335, 341, 343, 23, 26, 27, 28, 29, 551, 555, 559, 560, 561, 227, 234, 235, 236, 237, 249, 257, 296, 297, 298, 300, 800

(56) References Cited

U.S. PATENT DOCUMENTS

| | | | | | |
|---|---|---|---|---|---|
| 2,254,962 A | * | 9/1941 | Haris et al. | .................. | 362/327 |
| 2,469,080 A | * | 5/1949 | Rosin et al. | .................. | 362/327 |
| 3,043,947 A | * | 7/1962 | Albinger, Jr. | .................. | 362/31 |
| 3,821,590 A | * | 6/1974 | Kossman et al. | ........... | 313/499 |
| 4,013,915 A | * | 3/1977 | Dufft | .......................... | 313/499 |
| 4,168,102 A | * | 9/1979 | Chida et al. | ................. | 313/500 |
| 4,236,480 A | * | 12/1980 | Grohl | .......................... | 362/29 |
| 4,271,408 A | * | 6/1981 | Teshima et al. | ............. | 362/240 |
| 4,274,217 A | | 6/1981 | Ohshima | | |
| 4,698,730 A | * | 10/1987 | Sakai et al. | .................. | 362/311 |
| 4,935,665 A | * | 6/1990 | Murata | ...................... | 362/240 |
| 4,965,488 A | * | 10/1990 | Hihi | ........................... | 313/499 |
| 5,047,761 A | * | 9/1991 | Sell | .............................. | 362/28 |
| 5,272,463 A | * | 12/1993 | Furuya et al. | ................ | 362/28 |
| 5,284,108 A | * | 2/1994 | Furuya | ......................... | 362/23 |
| 5,526,190 A | * | 6/1996 | Hubble et al. | .............. | 359/719 |
| 5,645,337 A | | 7/1997 | Gleckman | | |
| 5,894,195 A | * | 4/1999 | McDermott | .................. | 313/512 |
| 5,894,196 A | * | 4/1999 | McDermott | .................. | 313/512 |
| 5,898,267 A | * | 4/1999 | McDermott | .................. | 313/512 |
| 6,183,099 B1 | * | 2/2001 | Garay et al. | ................... | 362/26 |
| 6,333,509 B1 | * | 12/2001 | Lumpp | .................... | 250/504 R |
| 6,536,923 B1 | * | 3/2003 | Merz | .......................... | 362/327 |
| 6,642,850 B1 | * | 11/2003 | Noll et al. | ..................... | 362/26 |

FOREIGN PATENT DOCUMENTS

| EP | 0 362 993 | 4/1990 |
| EP | 0 736 415 | 10/1996 |
| FR | 2 760 414 | 9/1998 |

* cited by examiner

Primary Examiner—John Anthony Ward
Assistant Examiner—Ismael Negron
(74) Attorney, Agent, or Firm—Kenyon & Kenyon

(57) ABSTRACT

A lighting device for lighting a display surface is provided. The lighting device includes a light source, a lighting well and a lens, which is arranged between the light source and the display surface. Due to the combined use of the lighting well and the lens, light scattered laterally is also reflected in the direction of the display surface.

15 Claims, 3 Drawing Sheets

BACKLIGHTING DEVICE INCLUDING LENS

FIELD OF THE INVENTION

The present invention relates to a lighting device.

BACKGROUND INFORMATION

Lighting devices from other systems involve light sources for backlighting the display surface that are arranged on a side facing away from the user. To permit a homogeneous brightness distribution in backlighting the display surface, the light emitted by the light sources must be highly scattered, so that it may be distributed uniformly over the entire display surface. Furthermore, a light guide plate with light sources placed on its side faces may be arranged behind the display surface. The light of these light sources is injected into the light guide plate and deflected in the direction of the display surface. Light scatter may be omitted here, but provisions must be made for deflection of light and space must be provided for the light source in a lateral area of the display.

SUMMARY OF THE INVENTION

The exemplary lighting device according to the present invention may provide that light is distributed homogeneously over the entire display surface by using a reflector and a lens between the light source and the display surface, so that homogeneous lighting of the display surface may be achieved without additional films to be applied and without any additional light scatter. Due to the combined use of a reflector and a lens between the light source and the display surface, particularly efficient lighting of the display surface is allowed, because light scattered laterally is also reflected in the direction of the display surface.

The distance of the lens from the light source may be selected to be in the range of the focal distance of the lens. Then the lens does not function as an imaging optical system, but instead it homogenizes the light distribution of the light source.

The lighting well may be configured as a parabolic reflector to obtain a particularly homogeneous light distribution.

Light-emitting diodes may be used as the light sources because they are inexpensive and simple to install. Although traditional LEDs generally emit light in a preferential direction, a light cone emitted by the LED is widened for lighting a display surface by using the exemplary lighting device according to the present invention.

The lens may be located on a side of the lighting well facing away from the light source because in this manner the lens is integrally molded onto a light guide, for example, which is applied to the lighting well during the manufacture of the lighting device. A required plurality of lenses may be produced in one operation by integral molding onto a light guide for light sources arranged side-by-side.

A lens may be located on the light source, because in this manner the light source and the lens may be produced in one manufacturing operation, the lens may be molded onto a body of the LED and/or shaped by using an embossing stamp, for example.

The lens may be configured in an area around the optical axis of the lens as a dispersing lens and outside this area to configure it as a collecting lens. This makes the light distribution homogeneous due to the fact that the light is dispersed into central, very light areas of the light source and is collected and deflected in the direction of the display surface in edge areas where the light source is dark.

The exemplary lighting device according to the present invention may be used for backlighting a planar display because homogeneous backlighting is allowed using light sources, e.g., LEDs, due to the exemplary lighting device according to the present invention.

An exemplary lighting device according to the present invention may be used for a scale display in which individual segments of the scale are separately lightable and the particular lighting is separately controllable. Using an exemplary lighting device according to the present invention for each scale segment allows for implementation of a homogeneous, efficient and inexpensive backlighting, e.g., in comparison with regulating a scale segment lighting by using a liquid crystal cell. This exemplary lighting device according to the present invention may be used for a cruise control display in which individual segments are regularly activated or deactivated.

DETAILED DESCRIPTION

Figure 1A:
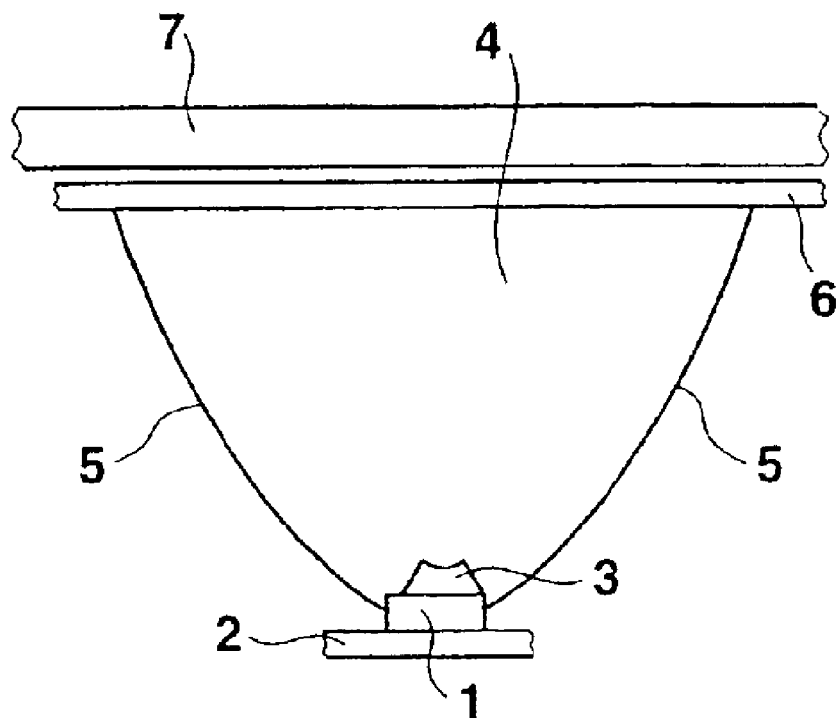
FIG. 1a shows a first exemplary embodiment of a lighting device according to the present invention in a side view.

FIG. 1a shows a side view of a first exemplary embodiment of a lighting device according to the present invention including a light source 1 provided on a circuit board 2. A lens 3 which deflects the light into a lighting well 4 is provided on light source 1. Lighting well 4 is bordered by a reflector 5 at the side. A diffuser 6 is provided on one end of lighting well 4 diametrically opposed to light source 1. A liquid crystal cell 7 is provided on the side of diffuser 6 facing away from lighting well 4. Light source 1 is configured as an LED. Light source 1 is supplied with an operating voltage via printed conductors (not shown in FIG. 1a) over circuit board 2. The light of light source 1 deflected by lens 3 either strikes diffuser 6 directly or strikes reflector 5 which forms the walls of lighting well 4. Reflector 5 is configured as a rotating body including a parabolic cross section. Reflector 5 is made of a white nonreflective plastic material. A configuration as a metal reflector is also allowed. Diffuser 6 is made of a plastic material and in an exemplary embodiment it is made of a plastic material with light-scattering particles incorporated into it, e.g., particles of a different plastic material having a different refractive index. FIG. 1a shows a liquid crystal cell 7 on diffuser 6; in an exemplary embodiment, the pixels of this liquid crystal cell are individually activatable electrically. FIG. 1a does not show the details of liquid crystal cell 7. The light guided from light source 1 through lens 3 either strikes diffuser 6 directly or first strikes reflector 5 and then is deflected to diffuser 6. Diffuser 6 contributes toward further homogenization of the light and deflects the light to liquid crystal cell 7. In one exemplary embodiment not shown in FIG. 1a, an invariable display, e.g., a dial or a warning field, e.g., made of a transparent plastic material including warning symbols printed on it, may be placed here instead of liquid crystal cell 7. In an exemplary embodiment, a warning symbol may be printed directly on diffuser 6.

Figure 1B:
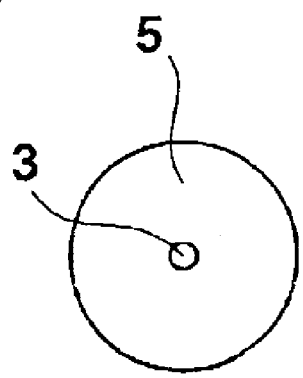
FIG. 1b shows a top view of the first exemplary embodiment.
Figure 2A:
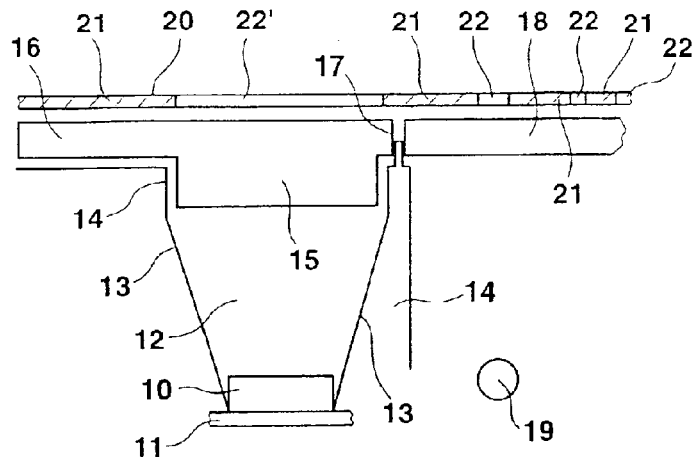
FIG. 2a shows a first side view of another exemplary embodiment according to the present invention of a lighting device for a scale display.

FIG. 1b shows a view of the exemplary lighting device according to the present invention, which was described with regard to FIG. 2a, without diffuser 6 or liquid crystal cell 7. Lighting well 4 is formed by reflector 5. Light source 1 together with lens 3 is arranged at the center of reflector 5.

FIG. 2a shows another exemplary embodiment of a lighting device according to the present invention in which a light source 10 is arranged on a circuit board 11. On the side facing away from circuit board 11, light source 10 is provided on a lighting well 12 and/or arranged so that it projects at least partially into lighting well 12 formed by a reflector 13. Reflector 13 is molded from a support 14. On the side of lighting well 12 facing away from light source 10, a lens 15 is provided, integrally molded on a light guide 16 which rests on support 14. Light from a light guide plate 18 which is arranged at the side next to light guide 16 and is adjacent to light guide 16 is injectable into a side face 17 of the light guide. Light guide plate 18 is lightable by another light source 19. Light source 10 is optically separated from additional light source 19 by support 14 which forms lighting well 12. A dial 20 is provided on the side of light guide 16 facing away from light source 10. Dial 20, which may be a numerical dial, includes first areas 21 which are opaque to light and second areas 22 which are permeable to light. Light source 10 is configured as an LED which is supplied with an operating voltage via circuit board 11. In an exemplary embodiment, support 14 is made of a plastic material such as polycarbonate pigmented with white pigment particles. In this manner, reflector 13 may be formed by a surface of support 14. In an exemplary embodiment not shown in FIG. 2a, metal coating of support 14 is also allowed. The light emitted by light source 10 either goes directly to lens 15 or is first deflected by reflector 13 to lens 15. Dial 20, which may be a numerical dial, is made of a transparent plastic material in which opaque first areas 21 may be applied by imprinting, for example. Symbols, scale segments or numbers may also be imaged through a suitable imprint. Light may be emitted to light guide plate 18 by additional light source 19, the light guide plate is made of a light-scattering material. Light is emitted by light guide plate 18 through light-permeable second areas 22 on dial 20. Furthermore, light is deflected by light guide plate 18 to first side face 17 of light guide 16 so that even for the case when light source 10 is not being operated, a segment 22' is at least weakly illuminated on the side of lens 15 facing away from light source 10. Segment 22' is then discernable even when light source 10 is switched off. This ensures that switching is allowed between a weakly illuminated state, namely illumination by additional light source 19, light guide plate 18, and light guide 16, and a brightly illuminated state when light source 10 is turned on. However, only an insignificant amount of light is sent from light source 10 into light guide plate 18 because the light is deflected by lens 15 in the direction of segment 22'. Light guide 16 and light guide plate 18 are made of polycarbonate in an exemplary embodiment, light guide 16 and lens 15 are configured to be transparent here.

Figure 2B:
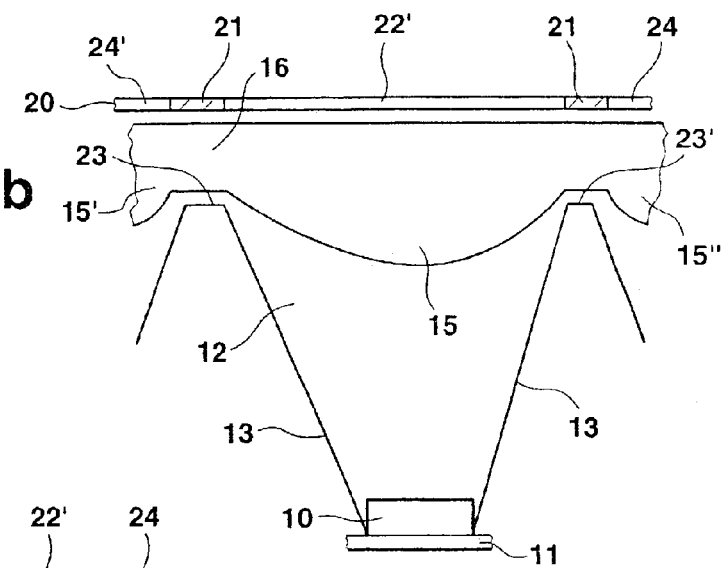
FIG. 2b shows another side view of the second exemplary embodiment according to the present invention.

FIG. 2b shows another side view of the exemplary lighting device according to the present invention as shown in FIG. 2a. Light guide 16 including an integral lens 15 sits on support 14 with contact faces 23, 23'. Lens 15 has a convex curvature in the direction of light source 10. Additional lenses 15' and 15" belonging to other lighting devices provided in addition to the exemplary lighting device according to the present invention, all are similar in configuration, are connected to light guide 16 on contact faces 23 and 23' of light guide 16 on support 14. The distance between lens 15 and light source 10 is approximately equal to the focal distance of lens 15. Therefore, lens 15 does not have an imaging function but instead performs a Fourier transform of the image in the focal plane, so that segment 22' is homogeneously backlighted. Segment 22' is separated from other transparent regions, i.e., segments 24, 24' of dial 20 by opaque first regions 21, so that separate backlighting of segments 22', 24' and 24 is allowed. Reflector 13 in the exemplary embodiment according to FIGS. 2a and 2b includes walls running linearly. In an exemplary embodiment, lighting well 12 bordered by reflector 13 includes a rectangular section in a plane parallel to the plane of the lens of lens 15.

Figure 2C:
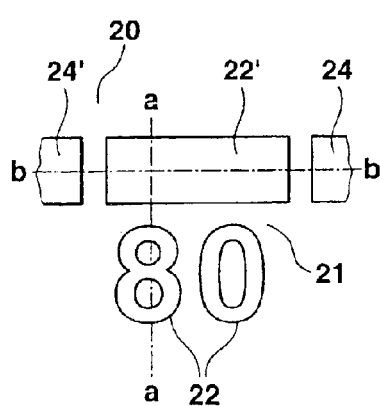
FIG. 2c shows a top view of the second exemplary embodiment according to the present invention.

FIG. 2c shows a top view of dial 20 behind which is arranged the exemplary lighting device according to the present invention as described in conjunction with FIGS. 2a and 2b. A section through the exemplary lighting device according to the present invention is shown by broken lines in FIG. 2c, the section according to FIG. 2a is represented by the letters a and the section according to FIG. 2b is represented by the letters b. In addition to opaque first regions 21, second light-permeable regions 22 represent a number formed by transparent regions on dial 20. The number is backlightable by additional light source 19 and light guide plate 18. Segment 22' is lighted by light source 10 separately from segments 24 and 24' which in an exemplary embodiment are each individually activatable by a lighting device according to the present invention. A basic brightness of the segments is ensured by light guide plate 18 even when the light sources behind segments 22', 24 and 24' are turned off.

Figure 3:
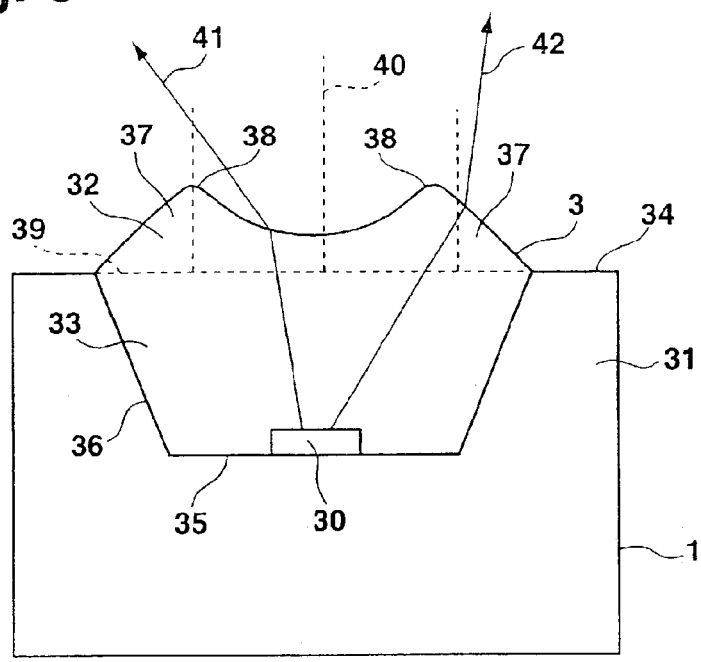
FIG. 3 shows an exemplary embodiment of a light source according to the present invention in a cross section.

FIG. 3 shows an exemplary embodiment of a location of the lens according to the present invention directly at the light source. The light source described in conjunction with FIG. 3 is used in particular as light source 1 in the exemplary embodiment explained with reference to FIG. 1a. Instead of an LED, an incandescent lamp, a glow lamp, and/or a fluorescent lamp may be used. FIG. 3 shows the location of a lens at a light source 1 configured as an LED, which may be a top LED. Light source 1 includes a light-producing region 30 which is made of a semiconductor material which is excited by trigger lines (not shown in the figure) to emit light. Light source 1 also includes a housing 31 in which is arranged lens 3, configured to have rotational symmetry with an optical axis 40 in light-producing region 30. Lens 3 includes a first region 33 and a second region 32, first region 33 is arranged beneath a surface 34 of housing 31, surface 34 facing in the direction of diffuser 6. Second region 32 is arranged on the side of surface 34 facing diffuser 6. First region 33 includes light-producing region 30 and has a pot shape. Side faces 36 running linearly to surface 34 of housing 31 are connected to pot bottom 35 running parallel to surface 34. Side faces 36 are configured to be reflective in an exemplary embodiment and, like housing 31, are made of a white plastic material. A transition between first region 33 and second region 32 is represented by a dotted line 39, which defines a diameter of lens 3, i.e., a double lens radius. Second region 32 is divided into an internal region 38 and an external region 37 with respect to optical axis 40 running perpendicular to surface 34. A border of the internal region is defined by a predefined radius about optical axis 40 which is smaller than the lens radius. In internal region 38, a surface of lens 3 has a concave curvature so that lens 3 acts to disperse light in internal region 38. A first ray of light 41 from light-producing region 30 is shown in the figure, passing through internal region 38 and leaving lens 3 in internal region 38. First ray of light 41 is diffracted away from optical axis 40. The walls of lens 3 are connected to surface 34 of housing 31 in external region 37 and are also connected in internal region 38. A surface of lens 3 runs linearly in external region 37, forming a wall running around internal region 38. A second ray of light 42 begins at light-producing region 30, leaves the lens in external region 37 and is diffracted toward optical axis 40.

Figure 4A:
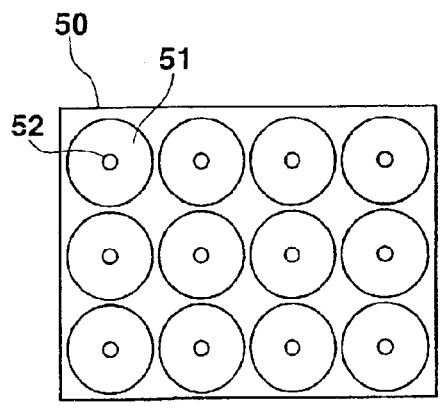
FIG. 4a shows an exemplary embodiment of a system of a lighting device according to the present invention for backlighting a planar display.
Figure 4B:
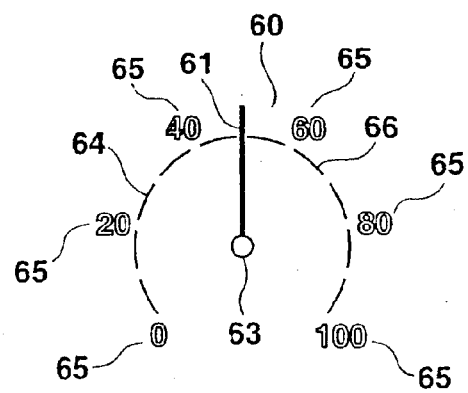
FIG. 4b shows a scale instrument which is lighted using an exemplary lighting device according to the present invention.

FIG. 4b shows a scale display including a dial 60 on which is displayed a numerical value on a scale 64 by a pointer. In an exemplary embodiment, the scale display is used for the speed display in a motor vehicle. A pointer 61 is movable on a pointer shaft 63 and points to a value on a scale 64 which is marked with numerical values 65. FIG. 4b shows numerical values 65 of "0," "20," "40," "60" and "80" on scale 64. Scale 64 includes individual scale segments 66, only one scale segment 66 of which is provided with a reference number in the figure for reasons of simplicity. Scale segments 66 are provided with one lighting device each on the side of dial 60 facing away from pointer 61, the lighting devices are electrically activatable separately so that individual scale segments 66 may be lighted up individually. Numerical values 65 are all lightable by one source for which light is also injected into scale segments 66 in the manner according to the present invention, as described in conjunction with FIG. 2a, when light sources 10 behind scale segments 66 are turned off. The exemplary lighting devices are controllable by a computing device (not shown in FIG. 4b) just as pointer 61 is controllable by a stepping motor mounted on pointer shaft 63 and also connected to the computing device. If a numerical value of "60" is preselected by user input, e.g., a speed of 60 kilometers per hour is selected, then all scale segments starting from numerical value 0 up to numerical value "60" are lighted up by the exemplary lighting devices according to the present invention. Scale segments from "60" to "100" to remain dark and are lighted only faintly by additional light source 19, which also lights up numerical values 65. A speed of 60 km per hour in an exemplary embodiment is a preselected speed in a cruise control in a motor vehicle in which a speed is input into the computing device and an automotive drive is regulated by the computing device so that the vehicle travels at the selected speed. The actual vehicle speed is then displayed by counter 61 on scale 64, so that a user constantly has an opportunity to compare a setpoint speed, namely the speed which is represented by the brightly lighted scale segments, e.g., 60 km/h with the actual vehicle speed. Since scale segments 66 are individually activatable, any other desired speed values may be preselected and displayed as a setpoint speed by a corresponding lighting of the scale segments.

What is claimed is:

1. A lighting device, comprising:
    a lighting well;
    a display surface;
    a light source arranged in the lighting well to emit a light that is beamable into the lighting well and guidable toward the display surface, the light being reflectable off of a wall of the lighting well; and
    a lens arranged between the light source and the display surface, a distance between the lens and the light source being approximately equal to a focal distance of the lens;
    wherein the display surface is arranged on a side of the lighting well facing away from the light source, and wherein the display surface includes a scale display arranged in a dial in a motor vehicle, and the scale display includes a plurality of scale segments, each of the plurality of scale segments being individually lightable and the lighting device being arranged on each of the plurality of scale segments.

2. The lighting device of claim 1, wherein the lighting well includes a parabolic reflector.

3. The lighting device of claim 1, wherein the light source includes at least one of a light-emitting diode, an incandescent lamp, a glow lamp, and a fluorescent lamp.

4. The lighting device of claim 1, wherein at least one of the following is satisfied: the lens includes a transparent plastic material; and the lens is formed by an injection molding method.

5. The lighting device of claim 1, wherein the lens is arranged between the lighting well and the display surface on the side of the lighting well facing away from the light source.

6. The lighting device of claim 1, wherein the lens is arranged on the light source.

7. The lighting device of claim 1, wherein the scale display is configured to display a set setpoint speed of a cruise control display in the motor vehicle.

8. The lighting device of claim 1, wherein the lighting well is made of one of a white plastic material and a metal.

9. A lighting device for lighting a display surface, comprising:
    a lighting well;
    a light source arranged in the lighting well to emit a light that is beamable into the lighting well and guidable toward the display surface, the light being reflectable off of a wall of the lighting well;
    a lens arranged between the light source and the display surface, a distance between the lens and the light source being approximately equal to a focal distance of the lens;
    a light guide for the lens; and
    wherein the display surface is arranged on a side of the lighting well facing away from the light source;
    wherein the lens is arranged between the lighting well and the display surface on the side of the lighting well facing away from the light source;
    wherein the lens is integrally molded on light guide, the light is injectable laterally into the light guide and the light is deflectable through the light guide toward the display surface.

10. The lighting device of claim 9, wherein the lens is rotationally symmetrical with an optical axis from the light source to the display surface.

11. The lighting device of claim 9, wherein the lens is at least partially convergent.

12. The lighting device of claim 9, wherein the display surface includes a planar display, and the lighting device is arranged on the planar display as a backlighting device for backlighting the planar display.

13. The light device of claim 12, wherein the planar display is one of a dial and a liquid crystal display.

14. The lighting device for lighting a display surface, comprising:
    a lighting well;
    a light source arranged in the lighting well to emit a light that is beamable into the lighting well and guidable toward the display surface, the light being reflectable off of a wall of the lighting well; and
    a lens arranged between the light source and the display surface, a distance between the lens and the light source being approximately equal to a focal distance of the lens;
    wherein the display surface is arranged on a side of the lighting well facing away from the light source;
    wherein the lens is arranged on the light source;
    wherein the lens includes a first region that is bordered by a predetermined radius around an optical axis from the light source to the display surface that is smaller than a lens radius and a second region arranged outside the first region around the optical axis, wherein in the first region, the lens refracts the light transmitted through a surface of the lens away from the optical axis of the lens, and wherein in the second region, the lens refracts the light transmitted through the surface of the lens toward the optical axis.

15. The lighting device of claim 14, wherein at least one of the following is satisfied: the light source includes a top light-emitting diode; and the lens is formed from a body of the top light-emitting diode.

* * * * *

UNITED STATES PATENT AND TRADEMARK OFFICE
CERTIFICATE OF CORRECTION

PATENT NO. : 6,957,901 B2
DATED : October 25, 2005
INVENTOR(S) : Harald Schach et al.

It is certified that error appears in the above-identified patent and that said Letters Patent is hereby corrected as shown below:

<u>Title page,</u>
Item [57], ABSTRACT,
Lines 1-2, change "a display surface is provided. The lighting device includes" to
-- a display surface includes --.

<u>Column 7,</u>
Line 5, change "the lighting device" to -- A lighting device --.

Signed and Sealed this

Twenty-eighth Day of March, 2006

JON W. DUDAS
*Director of the United States Patent and Trademark Office*